July 4, 1933.  A. P. JACOBSEN  1,916,953
CATTLE HITCH
Filed June 11, 1931   2 Sheets-Sheet 2
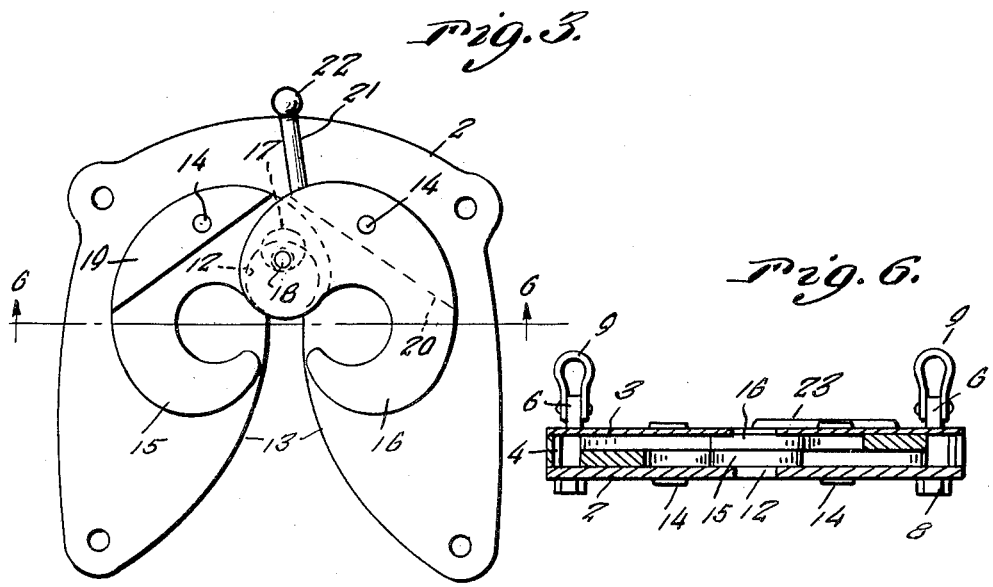
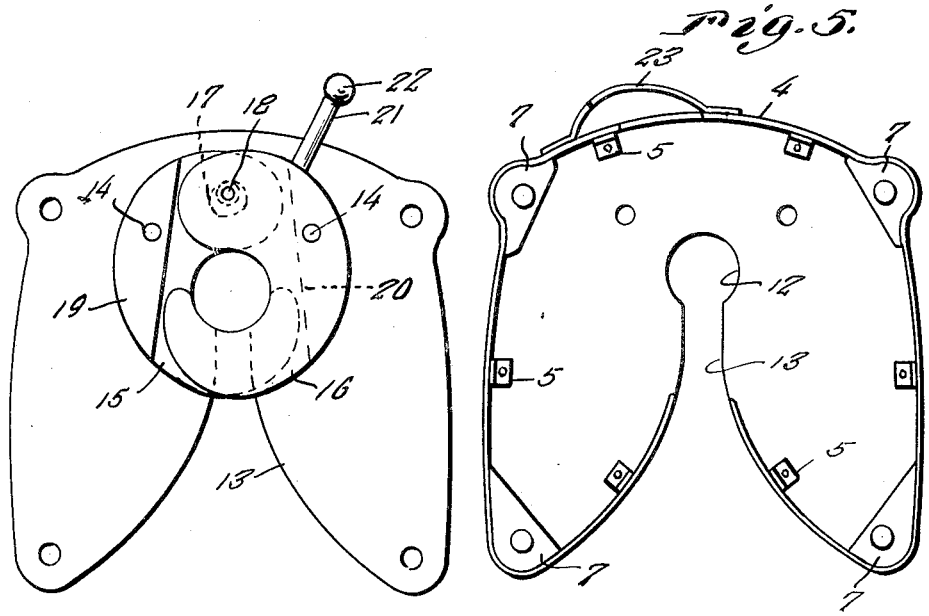
Inventor
Armand P. Jacobsen,
By Clarence A. O'Brien
Attorney Patented July 4, 1933

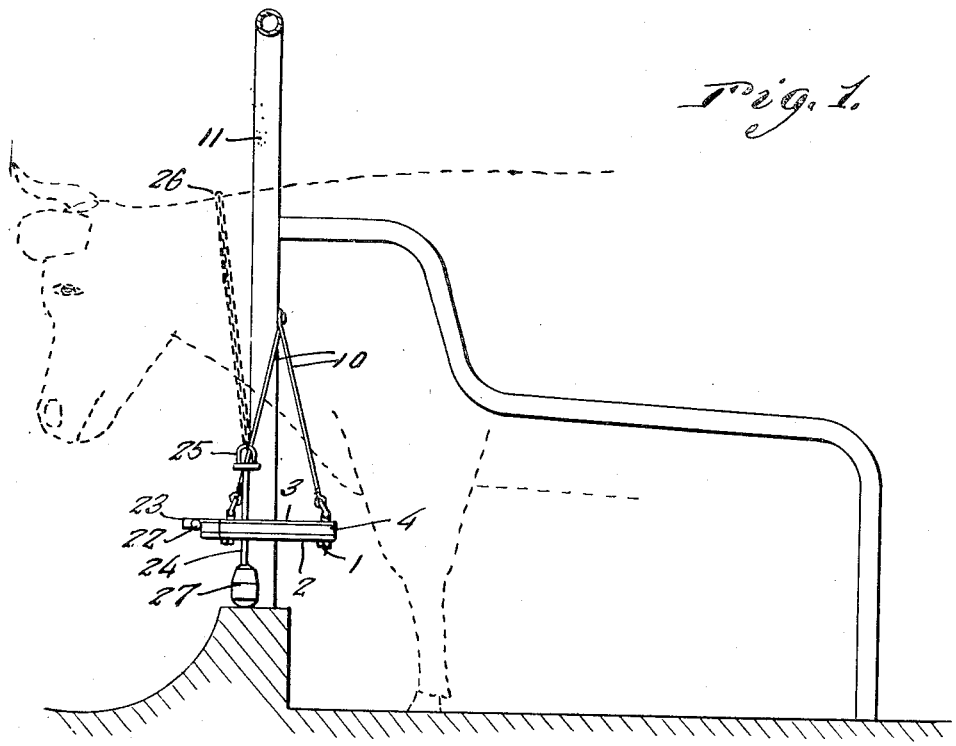
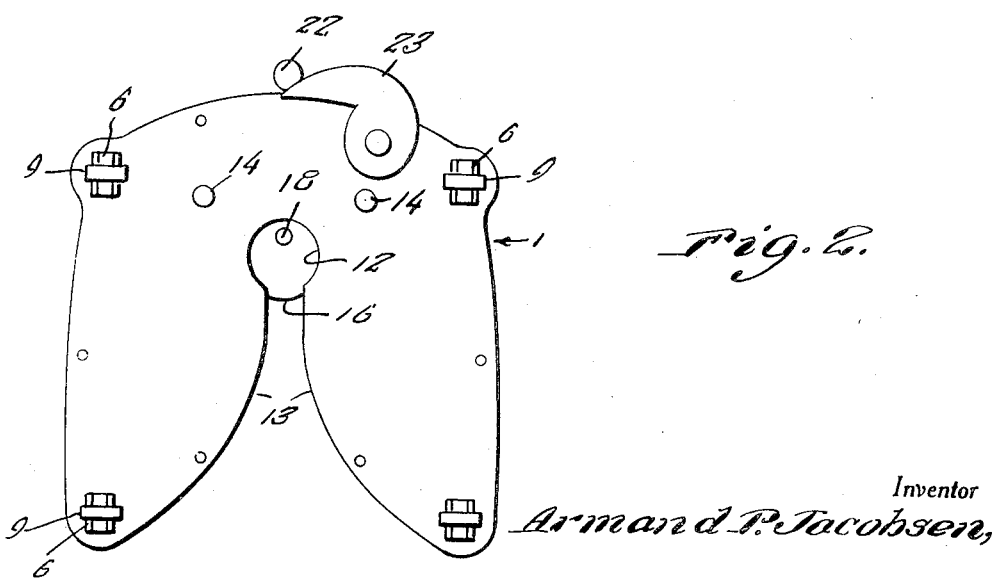

1,916,953

UNITED STATES PATENT OFFICE

ARMAND P. JACOBSEN, OF CRANBURY, NEW JERSEY, ASSIGNOR OF ONE-HALF TO WILLIAM SAYLER, OF CRANBURY, NEW JERSEY

CATTLE HITCH

Application filed June 11, 1931. Serial No. 543,699.

The present invention relates generally to cattle hitches and more particularly to new and useful improvements in means for hitching cattle in stalls and has for one of its important objects to provide, in a manner as hereinafter set forth, a hitch embodying a novel construction, combination and arrangement of parts through the medium of which the cow will be automatically hitched in the stall, the device being animal actuated.

Other important objects of the invention are to provide a cattle hitch of the character described, which will be simple in construction, strong, durable, efficient and reliable in operation and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:—

Figure 1 is a view in side elevation showing a hitch in accordance with this invention in locked or operative position.

Figure 2 is a view in top plan of the lock or latch portion of the hitch.

Figure 3 is a view in top plan of the lock or latch portion of the hitch with the upper and side portions of the casing removed.

Figure 4 is a view similar to Figure 3 but showing the pivoted keepers or jaws in closed position.

Figure 5 is a view in bottom plan of the upper and side portions of the casing.

Figure 6 is a view in vertical cross section taken substantially on the line 6—6 of Figure 3 with the upper and the side portions of the casing in position.

Referring now to the drawings in detail, it will be seen that the cattle hitch constituting the present invention comprises a casing which is designated generally by the reference numeral 1, said casing including a bottom plate 2, a top plate 3 to the marginal portions of which the side walls 4 are rigidly secured by any suitable means, as by the angle members 5. The side walls 4 abut the marginal portions of the bottom plate 2 and constitute means for spacing the plates 2 and 3 from each other.

The plates 2 and 3 are provided, in their corner portions with registering openings for the passage of bolts 6 which are inserted from the top of the casing, said bolts being threaded through the blocks 7 which are provided therefor in the corner portions of the casing and having threaded on their lower end portions the nuts 8 which are engageable with the bottom plate 2. In this manner the casing is secured together in a manner to permit the same to be expeditiously assembled or disassembled.

The heads of the bolts 6 are provided with pairs of flat sides and pivotally secured to said heads are the yokes 9 which constitute means for connecting the suspension cables 10 to the casing 1, said cables being anchored to the forward uprights 11 of the stall for supporting the casing horizontally and in suspended position in the stall.

Extending vertically through the casing 1 is an opening 12 with which the inner end of a flared slot 13 merges, said slot extending into the casing from the rear side thereof, the narrow or restricted end of the slot 13 communicating with the opening 12. As best seen in Figure 5 of the drawings, the side walls 4 of the casing 1 extend into the mouth portion of the flared slot 13 and terminates in spaced relation to the opening 12.

Spaced pins 14 extend between the plates 2 and 3 of the casing 1 adjacent and forwardly of the opening 12 and journaled for oscillation on said pins within the casing 1 are the substantially C-shaped complementary keepers or jaws 15 and 16. Adjacent one end the jaw 15 is provided with an opening 17 for the reception of a lug 18 which depends from the corresponding end of the jaw or keeper 16 for operatively connecting said jaws or keepers together whereby the member 15 will be caused to move in open position when the jaw 16 is swung to open position by the arm 21. The lug 18 fits loosely in the opening 17. It will be noted that the jaws or keepers 15 and 16 are journaled at intermediate points on the pins 14. Thus, the retaining ends of the jaws or keepers are adapted to be swung in overlapping relation to each other across the inner end portion of the slot 13 in a manner to close the opening 12, as illustrated to advantage in Figure 4 of the drawings. When the jaws or keepers are swung to inoperative position, as seen in Figure 3 of the drawings, the retaining ends thereof are disposed adjacent opposite sides of the slot 13 while the other ends of said jaws or keepers are swung into the opening 12 toward the inner end of the slot 13. On its upper side the jaw or keeper 15 has formed integrally thereon an abutment 19 for engagement by the retaining end of the jaw or keeper 16 for limiting the swinging movement of the jaws or keepers toward their closed or operative position. The other end portion of the abutment 19 is disposed in the path of the other end of the jaw or keeper 16 for swinging the jaw or keeper 15 toward its inoperative position simultaneously with the movement of the jaw or keeper 16 toward its inoperative position. The jaw or keeper 16 is provided, on its lower side with an abutment 20 for engagement by the jaw or keeper 15 and the abutment 20 is identical in construction and function with the abutment 19. The arm 21 is rigidly mounted on the jaw or keeper 16 and projects therefrom through a slot provided therefor in the forward wall of the casing 1, said arm 21 having a ball or head 22 on its free end. The arm 21, of course, provides means for manually actuating the jaws or keepers 15 and 16. A guard 23 for the arm 21 is provided on the forward wall of the casing 1. As will be seen when the parts are in closed position, the arm 21 will be protected by the guard 23 so that there is no danger of the arm being struck and moved to open position.

A rod 24 has mounted on its upper end a yoke 25 for connection with a chain 26 through the medium of which the rod 24 is suspended from the neck of a cow or other animal. Fixed on the lower end of the rod 24 is a head 27 which preferably is in the form of a weight.

In use, the casing 1 is suspended in the front portion of the stall at all times and the rod 24 is suspended from the neck of the cow or other animal at all times. The jaws or keepers 15 and 16 are disposed in the position shown in Figure 3 of the drawings and when the cow or other animal enters the stall and disposes its head above the feed trough or the like, the rod 24 enters the flared slot 13 and is guided thereby toward the opening 12. The rod 24 engages the end portions of the jaws or keepers 15 and 16 which are projected into the opening 12, thus swinging the jaws or keepers from the inoperative position shown in Figure 3 to the operative position shown in Figure 4 of the drawings for retaining the rod 24 in the opening 12, said rod 24 having swung the end portions of the jaws or keepers 15 and 16 forwardly out of the opening 12. To release the rod 24, the jaws or keepers 15 and 16 are swung from the position shown in Figure 4 of the drawings to the position shown in Figure 3 through the medium of the arm 21 and the cow or other animal is free to leave the stall. If desired, a weighted chain or cable may be substituted for the rod 24.

It is believed that the many advantages of a cattle hitch constructed in accordance with the present invention will be readily understood, and although the preferred embodiment of the invention is as illustrated and described, it is to be understood that changes in the details of construction and in the combination and arrangement of parts may be resorted to which will fall within the scope of the invention as claimed.

What is claimed is:—

1. A cattle hitch comprising, in combination, a casing, means for suspending the casing in position in a stall, said casing having a slot extending thereinto, a member suspended from the animal's neck for engagement in the slot, and a pair of complementary keepers pivotally supported in the casing for disposition across the slot for retaining the member therein, said keepers being operatively engageable by the member entering the slot for actuation to their closed position by said member.

2. A cattle hitch comprising in combination, a casing having a slot extending thereinto, a pair of keeper members pivoted in the casing and having hook-shaped parts for disposition across the slot in overlapping relation when said keeper members are in closed position, said keeper members being pivoted in the casing intermediate their ends and provided with parts at the ends opposite the hook portions extending into the slot when the keeper members are in open position, a member suspended from an animal's neck for entering the slot, and engaging the last-mentioned part of the keeper members for swinging the keeper members to closed position to retain said member, suspended from the animal's neck, in the casing.

3. A cattle hitch comprising in combination, a casing having a slot extending thereinto, a pair of keeper members pivoted in the casing and having hook-shaped parts for disposition across the slot in overlapping relation when said keeper members are in closed position, said keeper members being pivoted in the casing intermediate their ends and provided with parts at the ends opposite the hook portions extending into the slots when the keeper members are in open position, a member suspended from an animal's neck for entering the slot, and engaging the last-mentioned part of the keeper members for swinging the keeper members to closed position to retain said member, suspended from the animal's neck, in the casing, a handle connected with one of the keeper members and extending from the casing for moving the said member to open position, and one member having an opening therein and the other member having a pin thereon engaging the opening, whereby movement of the one member by its handle will move the other member to open position.

In testimony whereof I affix my signature.

ARMAND P. JACOBSEN.